US009032482B2

(12) United States Patent
Kondou et al.

(10) Patent No.: US 9,032,482 B2
(45) Date of Patent: May 12, 2015

(54) INFORMATION PROCESSING APPARATUS AND CONTROL METHOD

(71) Applicant: Fujitsu Limited, Kawasaki-shi, Kanagawa (JP)

(72) Inventors: Hiroshi Kondou, Yokohama (JP); Takafumi Anraku, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 27 days.

(21) Appl. No.: 13/966,330

(22) Filed: Aug. 14, 2013

(65) Prior Publication Data

US 2014/0068792 A1     Mar. 6, 2014

(30) Foreign Application Priority Data

Aug. 31, 2012 (JP) ................. 2012-191491

(51) Int. Cl.
*G06F 21/00* (2013.01)
*G06F 21/10* (2013.01)
*G06F 21/70* (2013.01)

(52) U.S. Cl.
CPC .............. *G06F 21/105* (2013.01); *G06F 21/10* (2013.01); *G06F 21/70* (2013.01)

(58) Field of Classification Search
CPC ........ G06F 21/105; G06F 21/70; G06F 21/10
USPC .......................................................... 726/30
See application file for complete search history.

(56) References Cited

U.S. PATENT DOCUMENTS

| 7,814,366 B2 | 10/2010 | Apparao et al. | |
|---|---|---|---|
| 2004/0199632 A1 | 10/2004 | Romero et al. | |
| 2004/0221193 A1 | 11/2004 | Armstrong et al. | |
| 2007/0112682 A1* | 5/2007 | Apparao et al. | 705/59 |
| 2008/0005539 A1* | 1/2008 | Velhal et al. | 712/220 |
| 2009/0049336 A1 | 2/2009 | Hara | |
| 2011/0307885 A1* | 12/2011 | Cushion et al. | 718/1 |
| 2012/0117403 A1* | 5/2012 | Bieswanger et al. | 713/322 |

(Continued)

FOREIGN PATENT DOCUMENTS

| JP | 07-3561002 B2 | 6/2004 |
|---|---|---|
| JP | 2004-288183 | 10/2004 |

(Continued)

OTHER PUBLICATIONS

"Sun Fire™ Entry-Level Midrange System Administration Guide", Nov. 30, 2007, XP055089950, Retrieved from the Internet: URL:http://docs.oracle.com/cd/E19095-01/sfe2900.srvr/819-1269-11/819-1269-11.pdf, [retrieved on Nov. 25, 2013], pp. 1-170.

(Continued)

*Primary Examiner* — Michael Pyzocha
(74) *Attorney, Agent, or Firm* — Fujitsu Patent Center

(57) ABSTRACT

An information processing apparatus is capable of performing a plurality of processes in parallel, and includes a plurality of operation components each including individual components, which are provided for respective processes to be performed in parallel. A control unit permits activation of as many operation components as the number of right-to-use licenses, out of the operation components. When detecting an abnormality in an individual component included in an active operation component, the control unit deactivates the other individual components of the operation component including the abnormal individual component, and activates another inactive operation component.

8 Claims, 17 Drawing Sheets

(56) References Cited

U.S. PATENT DOCUMENTS

2012/0221884 A1* 8/2012 Carter et al. ............... 714/2
2013/0159799 A1* 6/2013 Brown et al. ............... 714/726
2014/0245034 A1* 8/2014 Rotem et al. ............... 713/300

FOREIGN PATENT DOCUMENTS

| JP | 2004-318885 | 11/2004 |
|----|-------------|---------|
| WO | 2007-099606 | 9/2007 |
| WO | 2009/118886 | 10/2009 |

OTHER PUBLICATIONS

"Power Systems Capacity on demand", Feb. 8, 2009, XP055089904, Retrieved from the Internet: URL:http://publib.boulder.ibm.com/infocenter/systems/scope/hw/topic/ipha2/iph2.pdf [retrieved on Nov. 25, 2013], pp. 1-44.

Kloski, Nick: "Introduction to Dynamic Reconfiguration and Capacity on Demand for Sun SPARC Enterprise Servers", Apr. 22, 2007, XP055089504, Retrieved from the Internet: URL:http://citeseerx.ist.su.edu/viewdoc/download?doi=10.1.1.183.5052&rep=rep1&type=pdf [retrieved on Nov. 21, 2013], pp. 1-9.

Cler, Charlie, "On-Demand Memory and Processor Capacity Improves Flexibility", May 31, 2012, XP055089686, IBM Systems Magazine, Retrieved from the Internet: URL:http://www.ibmsysternsmag.com/ibmi /administrator/systemsmanagement/CoD_flexibility/ [retrieved on Nov. 22, 2013], pp. 1-2.

Huang, Po-Tsang et al: "On-Demand Memory Sub-System for Multi-Core SoCs", SOC Conference (SOCC), International, IEEE, Sep. 26, 2011, pp. 122-127, XP032000303.

Database WPI, Week 199602, Thomson Scientific. London. GB; AN 1996-011963, XP002717024 , & JP356100B2, Sep. 2, 2004, abstract.

Extended European Search Report dated Dec. 20, 2013 for corresponding European Application No. 13181331.3.

European Office Action dated Nov. 4, 2014 for corresponding European Patent Application No. 13181331.3, 3 pages.

* cited by examiner

152 DOMAIN MANAGEMENT TABLE

| CORE ID | THREAD ID | STATUS | DOMAIN ID |
|---|---|---|---|
| 0 | 0 | in use | 0 |
| 0 | 1 | in use | 0 |
| 1 | 2 | in use | 1 |
| 1 | 3 | in use | 1 |
| 2 | 4 | in use | 1 |
| 2 | 5 | free | none |
| 3 | 6 | free | none |
| 3 | 7 | free | none |

FIG. 8

151 CORE MANAGEMENT TABLE

| LICENSED CORE COUNT | | UNLICENSED CORE COUNT | ABNORMAL CORE COUNT |
|---|---|---|---|
| DOMAIN-ASSIGNED CORE COUNT | DOMAIN-UNASSIGNED CORE COUNT | | |
| 3 | 3 | 2 | 0 |

⇩ AFTER REPLACEMENT

| 3 | 3 | 1 | 1 |

152 DOMAIN MANAGEMENT TABLE

| CORE ID | THREAD ID | STATUS | DOMAIN ID |
|---|---|---|---|
| 0 | 0 | in use | 0 |
| 0 | 1 | in use | 0 |
| 1 | 2 | in use | 1 |
| 1 | 3 | in use | 1 |
| 2 | 4 | in use | 1 |
| 2 | 5 | free | none |
| 3 | 6 | free | none |
| 3 | 7 | free | none |
| ... | ... | ... | ... |

Thread ID 2: ABNORMALITY

⇑ AFTER REPLACEMENT

| STATUS | DOMAIN ID |
|---|---|
| in use | 0 |
| in use | 0 |
| fail | none |
| free | none |
| in use | 1 |
| free | none |
| in use | 1 |
| in use | 1 |
| ... | ... |

INFORMATION PROCESSING APPARATUS AND CONTROL METHOD

CROSS-REFERENCE TO RELATED APPLICATION

This application is based upon and claims the benefit of priority of the prior Japanese Patent Application No. 2012-191491, filed on Aug. 31, 2012, the entire contents of which are incorporated herein by reference.

FIELD

The embodiments discussed herein are related to an information processing apparatus and a control method.

BACKGROUND

Capacity on Demand (CoD) allows users to use as many hardware resources such as Central Processing Unit (CPU) as needed in information processing apparatuses such as server computers.

For example, to limit the number of CPUs in use with the CoD in an information processing apparatus having a plurality of CPUs, a user pays for the number of CPUs to be used at the time of purchasing the information processing apparatus. Thereby, the user's information processing apparatus allows as many CPUs as the user paid for to run, and prohibits the remaining CPUs from operating. Then, when the user wants to increase the processing capability of the information processing apparatus, the user purchases additional right-to-use licenses for CPUs, so that the CPUs that have been deactivated are activated immediately.

One of techniques relating to the CoD to deal with a failure in a licensed processor is to activate an unlicensed replacement processor and then deactivate the failure processor.

In addition, of recent multicore processors, there are processors whose cores each have a plurality of hardware threads. A hardware thread may be called a "strand". The hardware threads in a core are capable of performing respective processes in parallel. Further, hardware resources such as registers may be specifically provided for each hardware thread.

Please see, for example, Japanese Laid-open Patent Publications Nos. 2004-288183 and 2004-318885, and International Publication Pamphlet No. WO 2007/099606.

By the way, in an information processing apparatus with a multicore processor including a plurality of cores each having a plurality of hardware threads as described above, the per-core licensing in the CoD has the following drawbacks. If an abnormality occurs in one of hardware resources that are specifically provided for each hardware thread and the abnormal hardware thread is replaced with another hardware thread, an excess of licenses may occur, depending on how the abnormal hardware thread is replaced.

SUMMARY

According to one aspect, there is provided an information processing apparatus that is capable of performing a plurality of processes in parallel and includes a plurality of operation components each including individual components provided for performing respective processes to be performed in parallel. The information processing apparatus includes a storage unit configured to store the number of right-to-use licenses, one given for each of the operation components, and a control unit configured to permit activation of as many operation components as the number of right-to-use licenses out of the plurality of operation components, and upon detecting an abnormality in one of the individual components included in one of active operation components, deactivate the other individual components of the active operation component including the individual component from which the abnormality was detected, and activate one of inactive operation components.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates exemplary information registered in a domain management table;

FIG. 13 illustrates an exemplary transition of a core management table;

FIG. 14 illustrates an exemplary transition of a domain management table;

DESCRIPTION OF EMBODIMENTS

Figure 1:
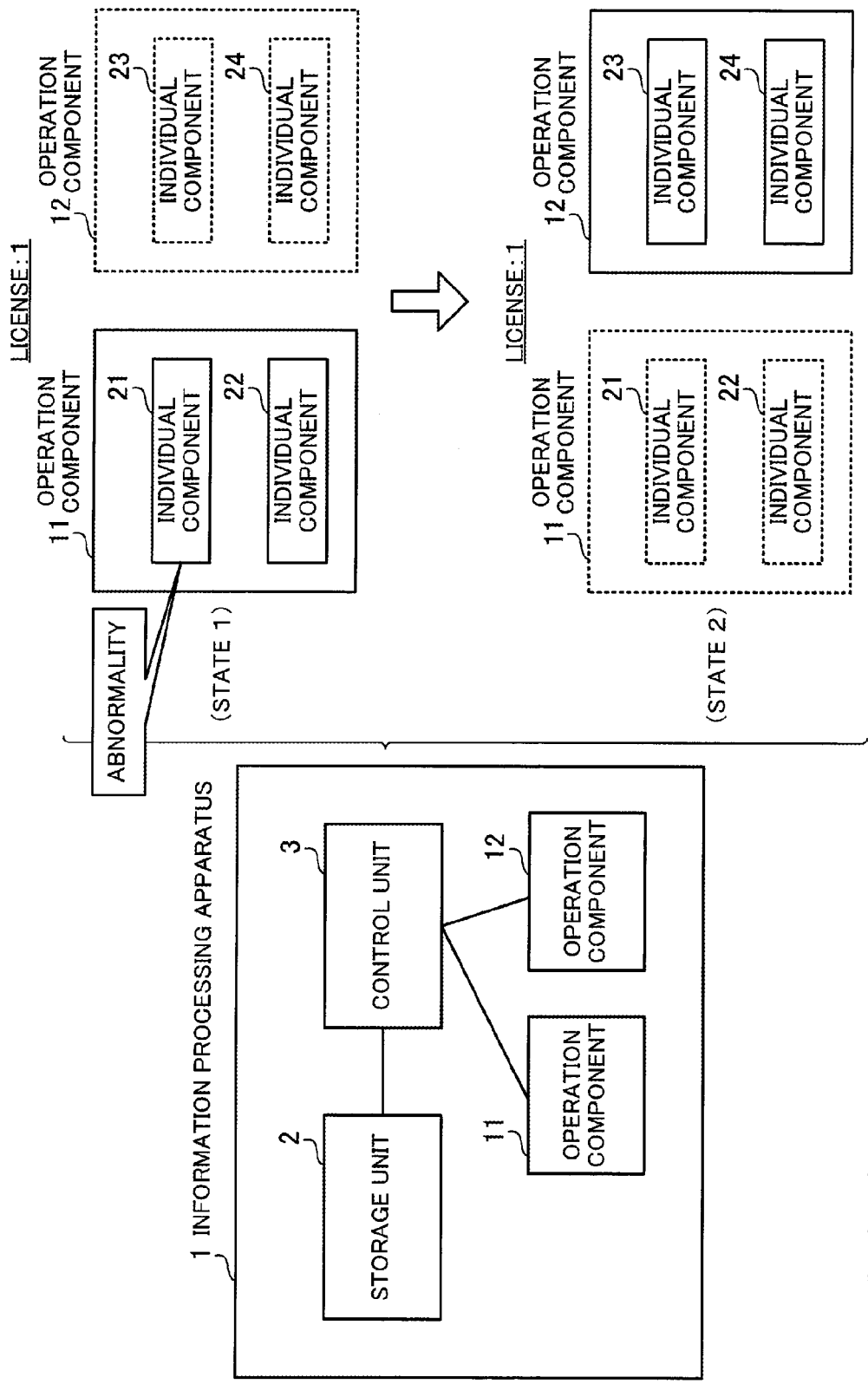
FIG. 1 illustrates an exemplary configuration and operation of an information processing apparatus according to a first embodiment.

Several embodiments will be described below with reference to the accompanying drawings, wherein like reference numerals refer to like elements throughout.

(First Embodiment)

FIG. 1 illustrates an exemplary configuration and operation of an information processing apparatus according to a first embodiment. An information processing apparatus 1 illustrated in FIG. 1 includes a storage unit 2, a control unit 3, and a plurality of operation components. In this example, the information processing apparatus 1 includes two operation components 11 and 12. However, two or any desired number of operation components may be provided.

The operation components 11 and 12 are implemented by using processor cores included in a processor or processors, for example. The control unit 3 is also implemented by using a processor core or a processor, for example. The control unit 3 may be implemented as one of the plurality of operation components. The storage unit 2 is implemented by using a non-volatile storage device such as a Hard Disk Drive (HDD), Solid State Drive (SSD), etc.

Each of the operation components 11 and 12 is able to perform a plurality of processes in parallel. Each of the operation components 11 and 12 includes individual components that are provided for respective processes to be performed in parallel. For example, the individual components are circuits like registers and buffers, and are used in computational processes. In the case where the operation components 11 and 12 are processor cores or processors, the individual components are, for example, register sets, instruction buffers, functional units, or any combination thereof.

In this embodiment, as illustrated in the right part of FIG. 1, assume that the operation component 11 includes individual components 21 and 22, and the operation component 12 includes individual components 23 and 24, by way of example. That is, the operation component 11 is able to perform two processes using the individual components 21 and 22 in parallel, and the operation component 12 is able to perform two processes using the individual components 23 and 24 in parallel. In this connection, "performing a plurality of processes in parallel" may include alternate execution of processes in a time division manner, and execution of processes in a pipeline manner, in addition to simultaneous execution of processes.

In the information processing apparatus 1, a right-to-use license (hereinafter, simply referred to as license) is given for each operation component. For example, the user of the information processing apparatus 1 pays a prescribed fee to get licenses. The storage unit 2 stores the number of purchased licenses.

The control unit 3 permits activation of as many operation components as the number of licenses stored in the storage unit 2. For example, the number of licenses is "1", the control unit 3 permits activation of one of the operation components 11 and 12, and prohibits activation of the other. As a result, the user is allowed to use only one operation component even when the information processing apparatus 1 has two or more operation components.

When detecting an abnormality in any one of the individual components of an active operation component, the control unit 3 deactivates the other individual components of the operation component including the abnormal individual component, and activates any one of the inactive operation components. More specifically, when detecting an abnormality in an individual component, the control unit 3 deactivates all of the other individual components of the operation component including the abnormal individual component even if there is no abnormality detected in the other individual components of the operation component. This process prevents an excess of licenses, i.e., prevents the number of active operation components from exceeding the number of licenses.

For example, as illustrated as a "state 1" in FIG. 1, assume that the operation component 11 is active, whereas the operation component 12 is inactive. In addition, assume that the number of purchased licenses is "1". In the right part of FIG. 1, active components are indicated by solid lines, whereas inactive components are indicated by dotted lines.

Then, assume now that the control unit 3 detects an abnormality in the individual component 21. At this time, the control unit 3 deactivates the individual component 22 even if there is no abnormality detected in the individual component 22. As a result, the operation component 11 stops its operation. Then, the control unit 3 activates the inactive operation component 12. In FIG. 1, a "state 2" indicates a state where the active operation component been changed to the other. Under this state, the control unit 3 causes the individual component 23 to continue the process that has been performed using the individual component 21, and also causes the individual component 24 to continue the process that has been performed using the individual component 22.

Now, let it assumed that one of the individual components 23 and 24 in the operation component 12 is activated to replace the individual component 21 that has stopped its operation due to the detected abnormality. In this case, the user additionally uses the operation component 12 and the number of active operation components becomes "2", which causes an excess of licenses.

On the other hand, the control unit 3 according to this embodiment always replaces hardware resources on an operation component basis when an abnormality is detected in an individual component. This prevents an excess of licenses. Referring to the exemplary operation illustrated in the right part of FIG. 1, the states 1 and 2 before and after hardware replacement both have the number of licenses of "1", which is within the number of purchased licenses.

(Second Embodiment)

The following describes a server apparatus with a multi-threaded multicore processor, as an example of an information processing apparatus.

Figure 2:
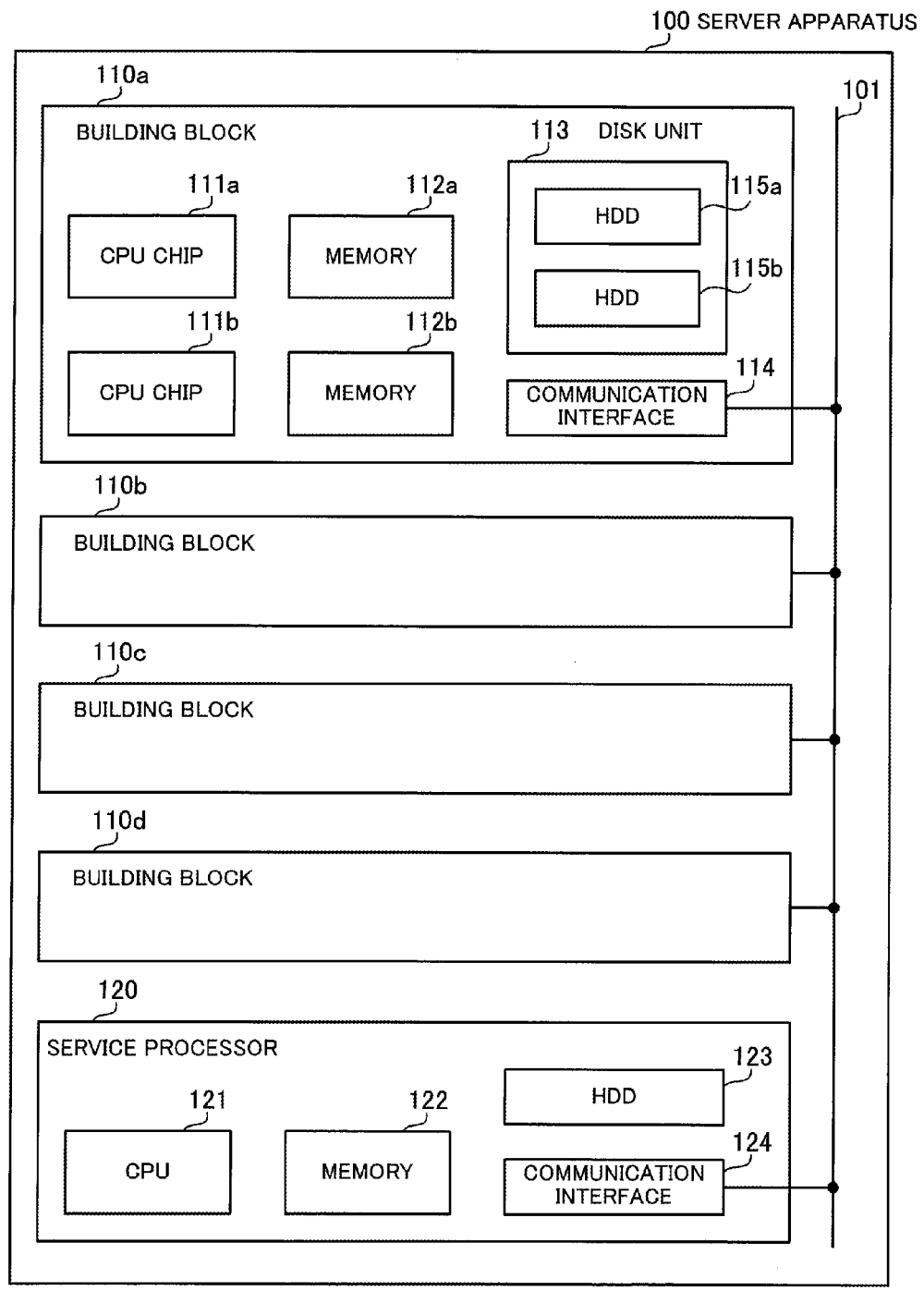
FIG. 2 illustrates an example of an entire configuration of a server apparatus according to a second embodiment.

FIG. 2 illustrates an example of an entire configuration of a server apparatus according to a second embodiment. A server apparatus 100 illustrated in FIG. 2 includes building blocks 110a to 110d and a service processor 120. For example, the building blocks 110a to 110d and service processor 120 are inserted into respective slots of a rack, and are connected to each other via a bus 101 provided in the backboard of the rack so as to perform data communication with each other.

The building block 110a includes CPU chips 111a and 111b, memories 112a and 112b, a disk unit 113, and a communication interface 114. These hardware resources in this building block 110a are mutually connected to each other, for example, with a cross bar, not illustrated. In addition, HDDs 115a and 115b are mounted on the disk unit 113.

Each of the CPU chips 111a and 111b is a multicore processor including a plurality of CPU cores, as will be described later. The CPU chip 111a loads a program from a non-volatile storage device such as the HDD 115a and 115b on the disk unit 113 into at least one of the memories 112a and 112b, and executes the loaded program. Similarly, the CPU chip 111b loads a program from a non-volatile storage device such as the HDD 115a and 115b on the disk unit 113 into at least one of the memories 112a and 112b, and executes the loaded program.

Both of the memories 112a and 112b are volatile memories. The memory 112a temporarily stores at least part of programs to be executed by one or both of the CPU chips 111a and 111b, and various data to be used in executing the programs. Similarly, the memory 112b temporarily stores at least part of programs to be executed by one or both of the CPU chips 111a and 111b, and various data to be used in executing the programs.

The HDDs 115a and 115b on the disk unit 113 store the programs and various data. In this connection, other kinds of non-volatile storage devices such as SSD may be mounted on the disk unit 113.

The communication interface 114 is connected to the bus 101 to perform data communication with the CPU chips 111a and 111b through the bus 101.

In this connection, a desired number of CPU chips and a desired number of RAMs may be provided in the building block 110a, and a desired number of non-volatile storage devices may be mounted on the disk unit 113.

The other building blocks 110b to 110d have the same hardware configuration as the building block 110a, and therefore will not be described again.

As described above, the server apparatus 100 has a plurality of building blocks each including one or more processors (here, CPU chips). A multiprocessor system is implemented by the server apparatus 100 having such a configuration as a whole.

The service processor 120 monitors the operation statuses of the building blocks 110a to 110d. The service processor 120 includes a CPU 121, memory 122, HDD 123, and communication interface 124.

The CPU 121 loads a firmware program from the HDD 123 into the memory 122, and executes the loaded firmware program. Thereby, the CPU 121 executes predetermined processes including monitoring of the building blocks 110a to 110d.

The memory 122 is a volatile memory that temporarily stores at least part of firmware programs and various data. The HDD 123 is an example of a non-volatile storage device, and other kinds of devices such as SSD may be used instead. The communication interface 124 is connected to the bus 101 to perform data communication with the CPU 121 through the bus 101.

In this connection, the server apparatus 100 of FIG. 2 has four building blocks, by way of example. Alternatively, a desired number of building blocks may be provided. In addition, the server apparatus 100 of FIG. 2 has one service processor, by way of example. Alternatively, a plurality of service processors may be provided. For example, service processors may be arranged to have a redundant configuration for improving performance reliability.

Figure 3:
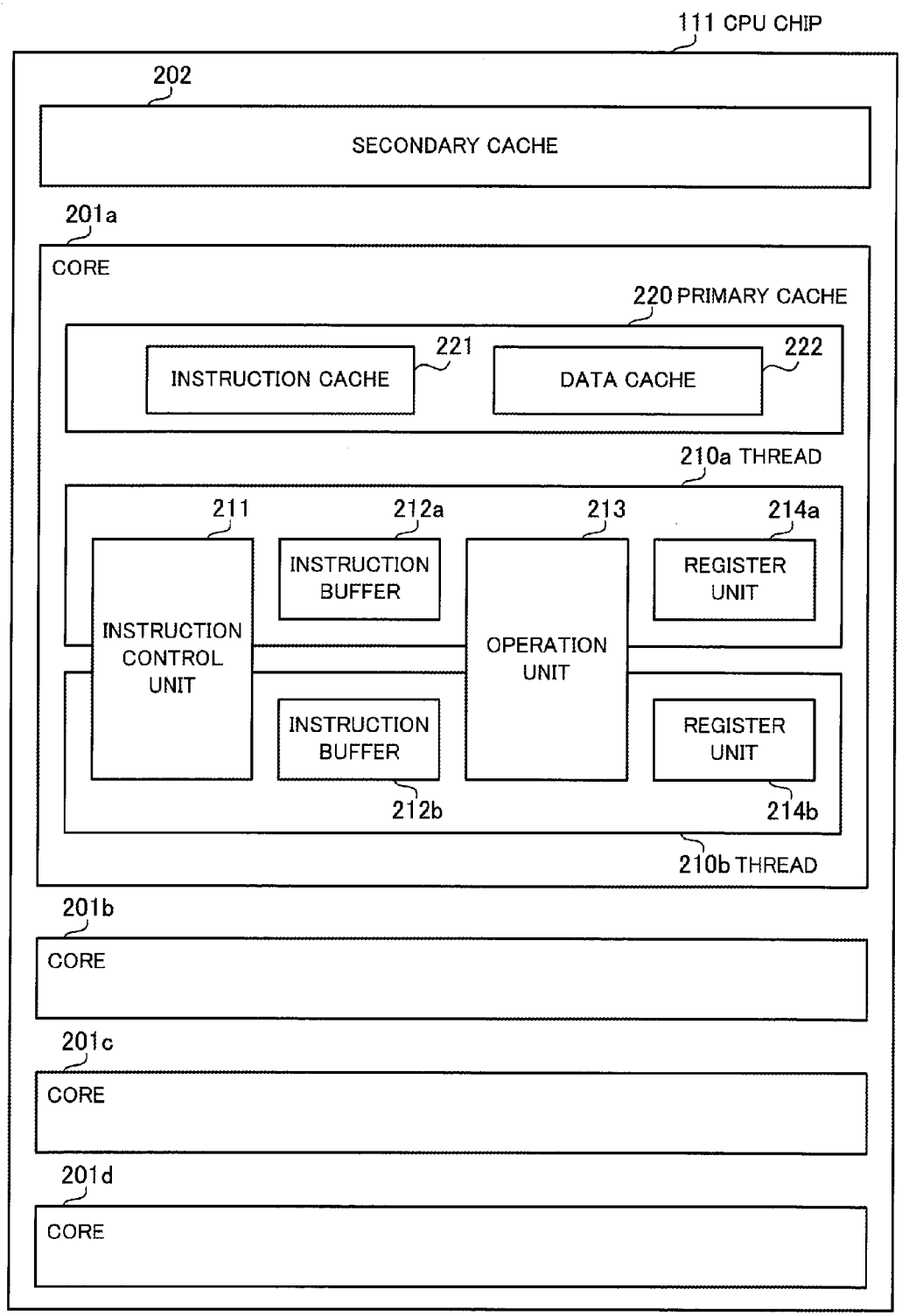
FIG. 3 illustrates an example of an internal configuration of a CPU chip.

FIG. 3 illustrates an example of an internal configuration of a CPU chip. A CPU chip 111 illustrated in FIG. 3 corresponds to a CPU chip (for example, CPU chip 111a or 111b in FIG. 2) provided in each of the building blocks 110a to 110d. That is to say, each of the building blocks 110a to 110d includes CPU chips having the same configuration as that illustrated in FIG. 3.

The CPU chip 111 includes cores 201a to 201d and a secondary cache 202. Each of the cores 201a to 201d corresponds to the operation component described in the first embodiment. Each of the cores 201a to 201d includes at least individual functional units that are able to perform their individual processes in parallel. In this connection, a desired number of cores may be mounted on the CPU chip 111. The secondary cache 202 is a cache memory that is shared by the cores 201a to 201d.

The core 201a includes threads 210a and 210b and a primary cache 220. Since the cores 201a to 201d have the same configuration, the configuration of the core 201a will be described below.

The primary cache 220 is a cache memory that is shared by the threads 210a and 210b. The primary cache 220 includes an instruction cache 221 for caching instructions and a data cache 222 for caching data.

The threads 210a and 210b are hardware threads that may be called "strand". The threads 210a and 210b are able to perform their individual processes in parallel. An individual process here is, for example, a unit of work (for example, software thread) that is performed by each CPU seen by an Operating System (OS) within a program running on the OS.

At least some of hardware resources corresponding to the threads 210a and 210b are specifically provided for each of the threads 210a and 210b. The threads 210a and 210b use their corresponding hardware resources to perform their individual processes.

Referring to the example of FIG. 3, the thread 210a includes an instruction buffer 212a and a register unit 214a as dedicated hardware resources. Similarly, the thread 210b includes an instruction buffer 212b and a register unit 214b as dedicated hardware resources. On the other hand, an instruction control unit 211 and operation unit 213 are shared by the threads 210a and 210b.

In this connection, the instruction buffer 212a and register unit 214a correspond to one of the individual components described in the first embodiment, and the instruction buffer 212b and register unit 214b correspond to the other of the individual components described in the first embodiment.

The instruction control unit 211 reads an instruction from a memory. The memory here is any one of the instruction cache 221, secondary cache 202, and a main memory device of the CPU chip 111 (corresponding to memories 112a and 112b of FIG. 2). In addition, the instruction control unit 211 may temporarily store an instruction read from a memory, into one of the instruction buffers 212a and 212b, and then read the stored instruction. The instruction buffer 212a is used for processes corresponding to the thread 210a, and the instruction buffer 212b is used for processes corresponding to the thread 210b.

The instruction control unit 211 decodes the read instruction, and causes the operation unit 213 to perform operations according to the decoding result. The operations to be performed by the operation unit 213 include, for example, addition, subtraction, multiplication, division, address calculation, etc. The operation unit 213 uses one of the register units 214a and 214b in order to read data to be used for operations and to write operation results. In addition, when a load instruction or store instruction is made, data is transferred between a memory and the register unit 214a or 214b. The memory here may be one of the data cache 222, secondary cache 202, and the main memory device of the CPU chip 111 (corresponding to memories 112a and 112b of FIG. 2). In the processes performed by the operation unit 213, the register unit 214a is used for the processes corresponding to the thread 210a, and the register unit 214b is used for the processes corresponding to the thread 210b.

The core 201a configured as above is able to perform, for example, an operation corresponding to one thread at the operation unit 213 and a data transfer between a memory and the instruction buffer or register unit corresponding to another thread in parallel. This improves processing performance.

In this connection, an instruction control unit and operation unit may be specifically provided for each thread. In this case, the core 201a is able to perform operations corresponding to threads simultaneously.

By the way, the server apparatus 100 according to this embodiment is compatible with the CoD technology. The user of the server apparatus 100 purchases one license (right-to-use license) to use each core. The server apparatus 100 sets as many cores as the number of purchased licenses to activation-permitted state, and sets the remaining cores to activation-prohibited state. When the user purchases additional licenses, the server apparatus 100 sets, out of the cores in the activation-prohibited state, as many cores as the number of additional licenses to the activation-permitted state. This allows the user to reduce the initial cost for introducing the server apparatus 100, and thereafter to immediately improve the capability of the server apparatus 100 according to necessity.

In this connection, a license is given for each core, not for each thread of cores, for the following reasons. As illustrated in FIG. 3, the threads in a core share some of hardware resources in the core. For example, referring to FIG. 3, the primary cache 220, instruction control unit 211, and operation unit 213 are shared by the threads 210a and 210b. Therefore, compared with the case where one of the threads operates in the core, the case where both threads operate in the core may decrease a processing speed per thread.

If a fixed license fee is set for each thread, a balance between the license fee and a processing speed may be spoiled depending on the operation statuses of threads, which results in inappropriate fee setting. By contrast, with respect to a plurality of cores in a CPU chip, a processing speed per core hardly varies depending on the operation statuses of the cores. Therefore, to keep a good balance between a license fee and a processing speed, it is preferable to give a license on a core basis, not on a thread basis.

The following describes how to deal with a failure in a hardware resource in a thread. It is now assumed that a failure occurs in one of hardware resources that are specifically provided for each thread.

In addition, in the following description, a "failure in thread" indicates a failure occurring in one of hardware resources that are specifically provided for each thread out of the hardware resources of threads. For example, referring to FIG. 3, a "failure in thread 210a" indicates a failure occurring in one or both of the instruction buffer 212a and register unit 214a in the thread 210a. A parity error occurring in a register in one thread may also be called a "failure in thread".

Further, in the following description, an identification number is represented as "#x". For example, a thread with an identification number of "0" is represented as a "thread #0".

Figure 4:
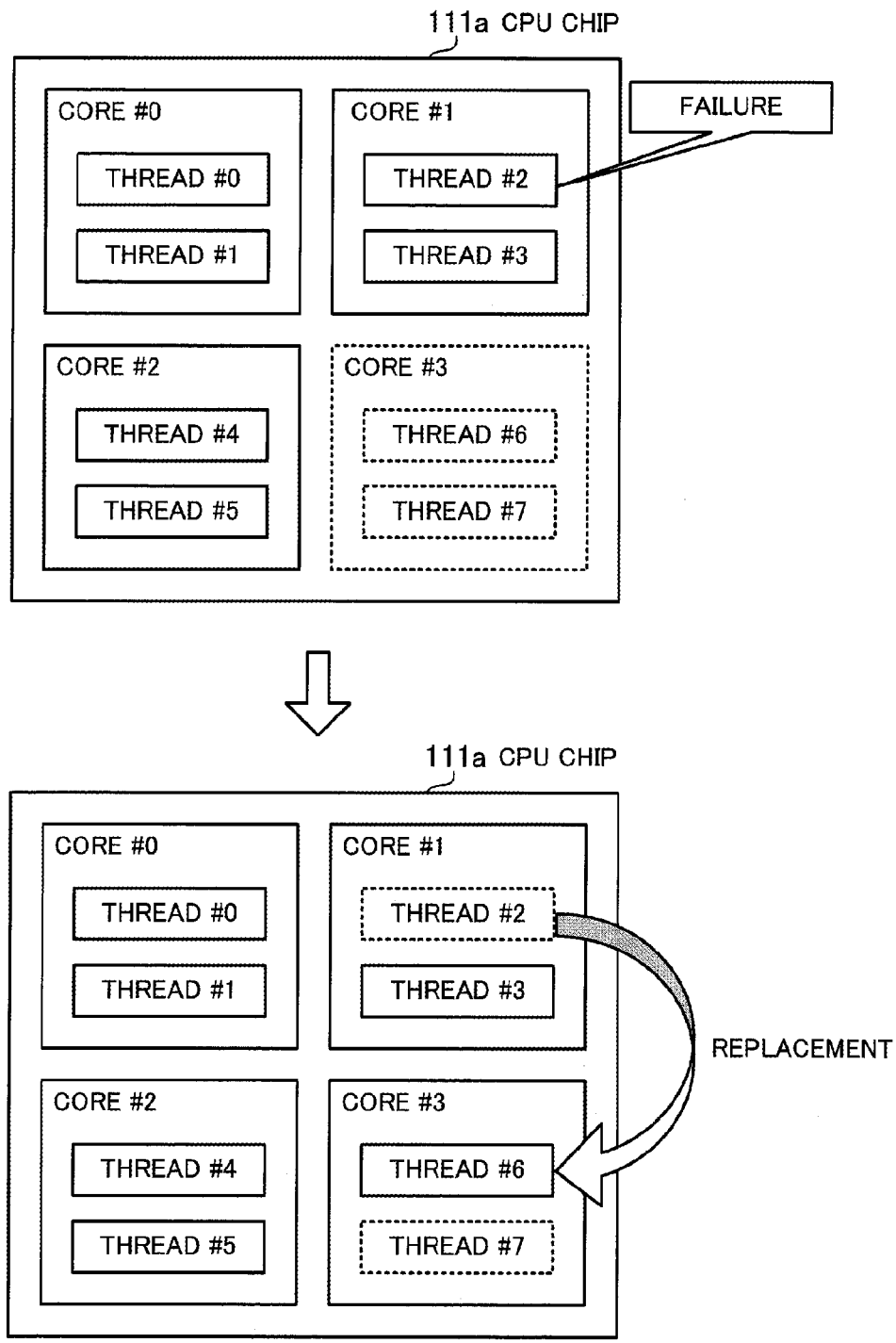
FIG. 4 illustrates a reference example of how to deal with a failure in thread.
Figure 5:
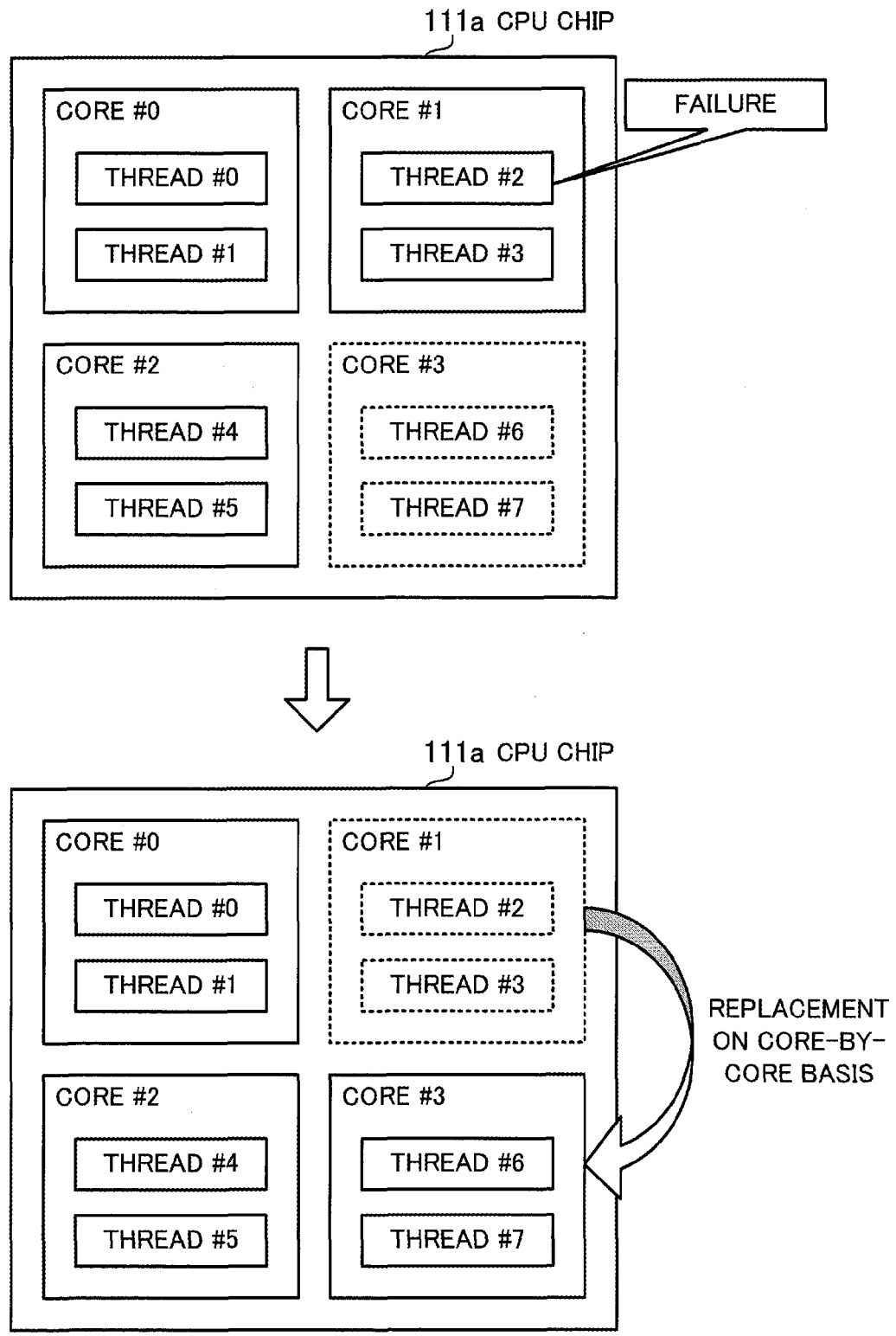
FIG. 5 illustrates an example of how to dealing with a failure in thread according to the second embodiment.

FIG. 4 illustrates a reference example of how to deal with a failure in thread. In FIGS. 4 and 5, hardware resources in the activation-permitted state are indicated by solid lines, whereas hardware resources in activation-prohibited state are indicated by dotted lines.

In FIG. 4, it is assumed, for example, that licenses are given for three cores. According to this license setting, out of four cores in the CPU chip 111a, cores #0, #1, and #2 are active, and a core #3 is inactive.

Assume now, for example, that the server apparatus 100 detects a failure from a thread #2 of the core #1. In this case, the server apparatus 100 replaces the failure thread #2 with another inactive thread so as to cause the replacement thread to continue the process that has been performed by the thread #2.

One of methods for the thread replacement is to replace the thread #2 from which a failure has been detected with an inactive thread of another core. The lower part of FIG. 4 illustrates an example where the failure thread #2 is replaced with an inactive thread #6 of the core #3. However, in this method, the process using the thread #3 continues as it is, and therefore the core #3 is additionally used together with the core #1. This increases the number of cores in use from "3" to "4", which causes an excess of licenses.

By contrast, in this embodiment, a hardware replacement process is performed as illustrated in FIG. 5 in order to prevent an excess of licenses. FIG. 5 illustrates an example of how to deal with a failure in thread according to the second embodiment.

The upper part of FIG. 5 illustrates the same situation as the upper part of FIG. 4, in which a failure is detected from the thread #2 of the core #1. At this time, the server apparatus 100 sets the core #1 to the activation-prohibited state even if no failure is detected from the other thread #3 of the core #1. At the same time, the server apparatus 100 activates one of the inactive cores. Referring to the example of FIG. 5, the inactive core #3 is activated, and this situation is illustrated in the lower part of FIG. 5. In this case, the server apparatus 100 causes the thread #6 to continue the process that has been performed by the thread #2, and the thread #7 to continue the process that has been performed by the thread #3, for example.

Such replacement process keeps "3" as the number of active cores before and after the replacement process. Therefore, an excess of licenses is prevented.

The following describes processes performed by the server apparatus 100 in detail.

Figure 6:
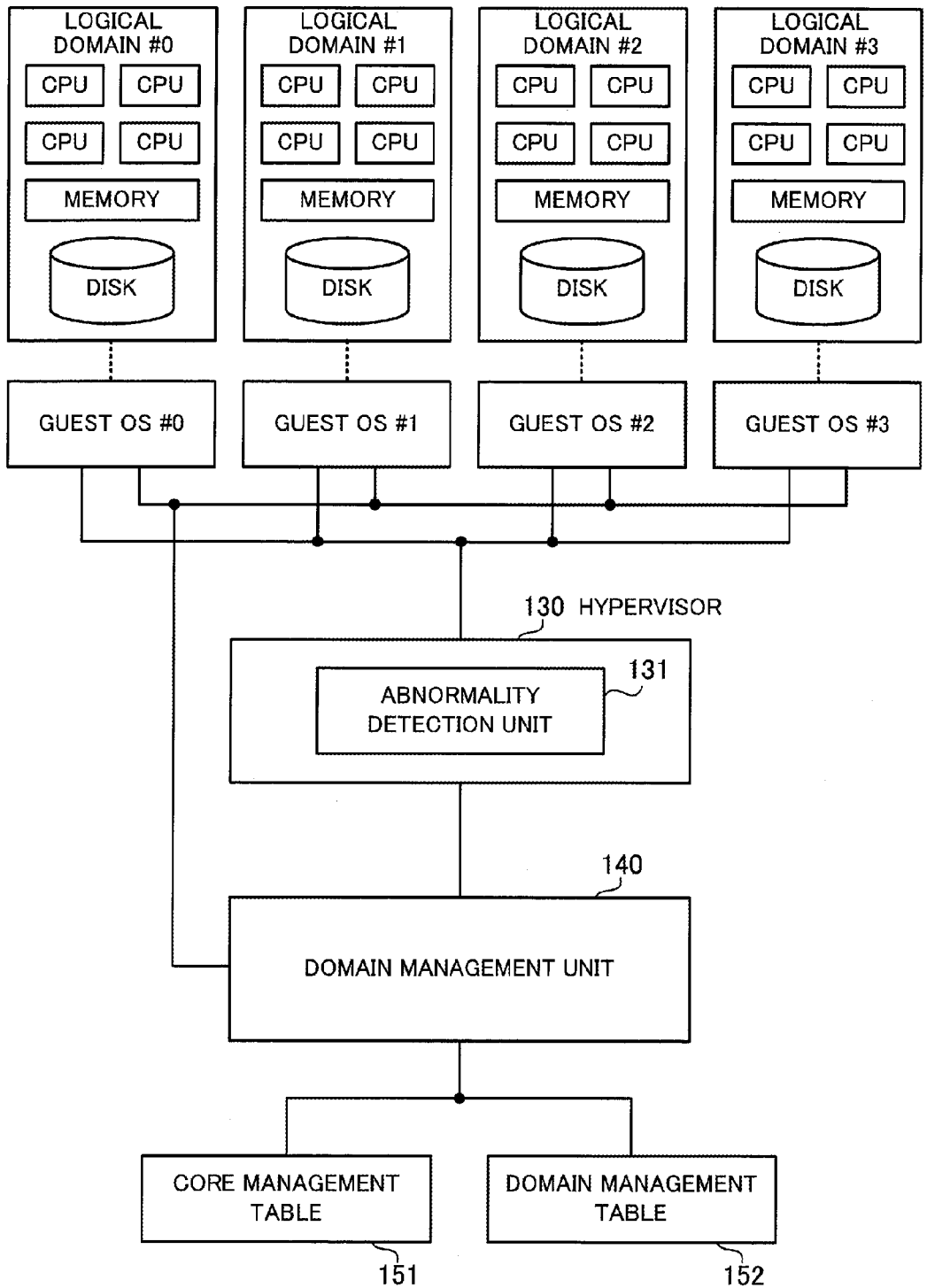
FIG. 6 is a block diagram illustrating an example of a functional configuration of an information processing apparatus.

FIG. 6 is a block diagram illustrating an example of a functional configuration of an information processing apparatus. The server apparatus 100 includes a hypervisor 130 and a domain management unit 140. In addition, the server apparatus 100 stores, in its local storage device, a core management table 151 and a domain management table 152.

The processes of the hypervisor 130 are implemented by a processor of the server apparatus 100 executing a hypervisor program. In addition, the processes of the domain management unit 140 are implemented by the processor of the server apparatus 100 executing a domain management program. These hypervisor program and domain management program are executed by at least one CPU chip provided in a building block, for example.

In the server apparatus 100, one or more virtual machines are created. Each logical domain #0 to #3 illustrated in FIG. 6 corresponds to a virtual machine, and a CPU, memory, disk (non-volatile storage device), etc. are assigned as virtual hardware resources to each logical domain #0 to #3. A virtual CPU assigned to each logical domain corresponds to a thread in a core. A plurality of virtual CPUs may be assigned to each logical domain.

In each logical domain, one or more assigned virtual CPUs, that is, one or more threads execute a guest OS program. Thereby, a different guest OS runs on each logical domain. Referring to the example of FIG. 6, guest OSes #0, #1, #2, and #3 run on the logical domains #0, #1, #2, and #3, respectively.

The hypervisor 130 provides an interface to real hardware resources for the guest OSes #0 to #3. Thereby, the guest OSes #0 to #3 run on the hypervisor 130.

The hypervisor 130 also includes an abnormality detection unit 131 for detecting an abnormality in hardware resources. The abnormality detection unit 131 is able to detect an abnormality in hardware resources (instruction buffer and register unit in this embodiment) specifically provided for each thread in a core.

The domain management unit 140 manages assignment of real hardware resources to each logical domain with reference to the core management table 151 and domain management table 152. The core management table 151 registers therein information of core licenses. The domain management table 152 registers therein information on assignment of threads to each logical domain.

In addition, the domain management unit 140 controls "dynamic reconfiguration" for disconnecting hardware resources from logical domains corresponding to guest OSes or incorporating hardware resources into logical domains without stopping the guest OSes. When detecting an abnormality in a thread, the domain management unit 140 instructs the guest OS assigned the abnormal thread to disconnect the thread and incorporate a new thread.

Figure 7:
FIG. 7 illustrates exemplary information registered in a core management table.

FIG. 7 illustrates exemplary information registered in a core management table. The core management table 151 registers therein a licensed core count, unlicensed core count, and abnormal core count. The licensed core count indicates the number of licenses purchased for cores by a user. In the core management table 151, the licensed core count field is further divided into domain-assigned core count and domain-unassigned core count. The domain-assigned core count indicates the number of cores assigned to logical domains, and the domain-unassigned core count indicates the number of cores that are not assigned to logical domains. The sum of the domain-assigned core count and the domain-unassigned core count indicates the total number of licenses purchased by the user.

The abnormal core count indicates the number of cores from which an abnormality was detected and then replaced with another core, out of the cores on the server apparatus 100. The unlicensed core count indicates a value obtained by subtracting the number of purchased licenses and the abnormal core count from the total number of cores on the server apparatus 100. Therefore, a value obtained by adding up the core counts registered in all fields of the core management table 151 indicates the total number of cores that are on the server apparatus 100 and are able to be licensed.

For example, at the stage where the server apparatus 100 is shipped, the number of licenses purchased by a user is registered in the domain-unassigned core count field. In addition, a value obtained by subtracting the number of purchased licenses from the total number of cores that are able to be licensed is registered in the unlicensed core count field. At this time, a value of "0" is registered in each of the domain-assigned core count field and abnormal core count field.

The domain management unit 140 sets up logical domains in accordance with, for example, inputs from a management terminal (not illustrated) connected to the server apparatus 100. When assigning a thread to a logical domain, the domain management unit 140 adds "1" to the domain-assigned core count and subtracts "1" from the domain-unassigned core count if any thread in the core including the thread is not assigned to a logical domain.

In addition, when the user purchases additional licenses, the domain management unit 140 receives an input as to the number of additional licenses. The domain management unit 140 adds the received number of additional licenses to the domain-unassigned core count, and subtracts the received number of additional licenses from the unlicensed core count. This increases the number of cores available to the user by the number of additional licenses.

Further, when detecting an abnormality in a thread, the domain management unit 140 replaces the core including the abnormal thread with another core, as described earlier. If the abnormal thread has been assigned to any logical domain, the domain management unit 140 subtracts "1" from the domain-assigned core count, and adds "1" to the abnormal core count.

FIG. 8 illustrates exemplary information registered in a domain management table. The domain management table 152 registers therein a status and domain ID in association with a core ID and thread ID.

A core ID is information identifying a core that is able to be licensed. A thread ID is information identifying a thread included in a corresponding core.

A status indicates the status of a corresponding thread. The status field contains any one of "in use", "free", and "fail". A status of "in use" indicates that a thread is assigned to a logical domain. A status of "free" indicates that a thread is not assigned to any logical domain. A status of "fail" indicates that an abnormality was detected from a thread and the thread is prohibited from being assigned to a logical domain.

The domain management unit 140 counts cores in which at least one of two threads has a status of "in use", as domain-assigned cores in the core management table 151. In addition, the domain management unit 140 counts cores in which two threads both have a status of "free", as domain-unassigned cores or unlicensed cores in the core management table 151.

The domain ID field contains the identification number of a logical domain to which a corresponding thread is assigned. If the thread is not assigned to any logical domain, "none" is registered in the domain ID field.

The domain management unit 140 updates the status and domain ID fields in the domain management table 152 when setting up a logical domain in response to a request from a management terminal or when detecting an abnormality in a thread.

In this connection, the above-described core management table 151 and domain management table 152 are stored, for example, on the HDD in the building block containing a CPU chip on which the above-described hypervisor program and domain management program run, and are deployed in the memory of the same building block.

Figure 9:
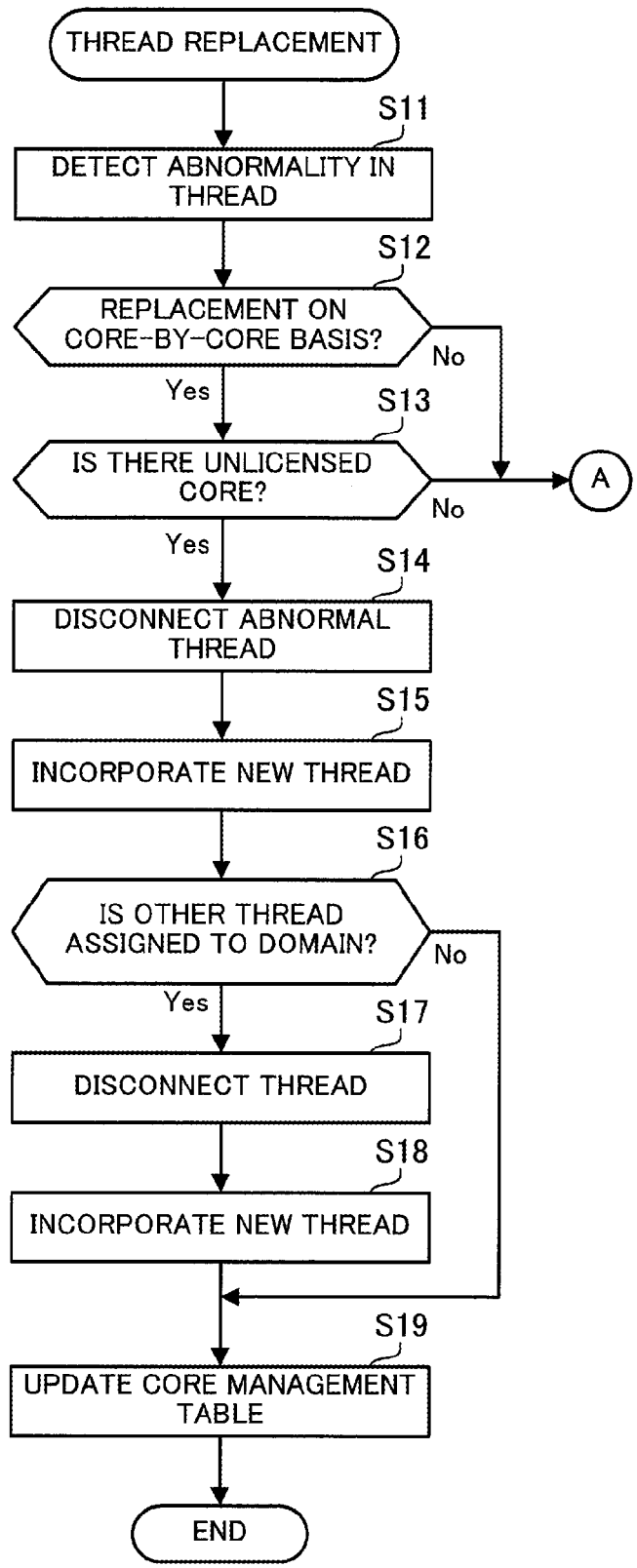
FIGS. 9 and 10 are a flowchart illustrating an exemplary thread replacement process.
Figure 10:
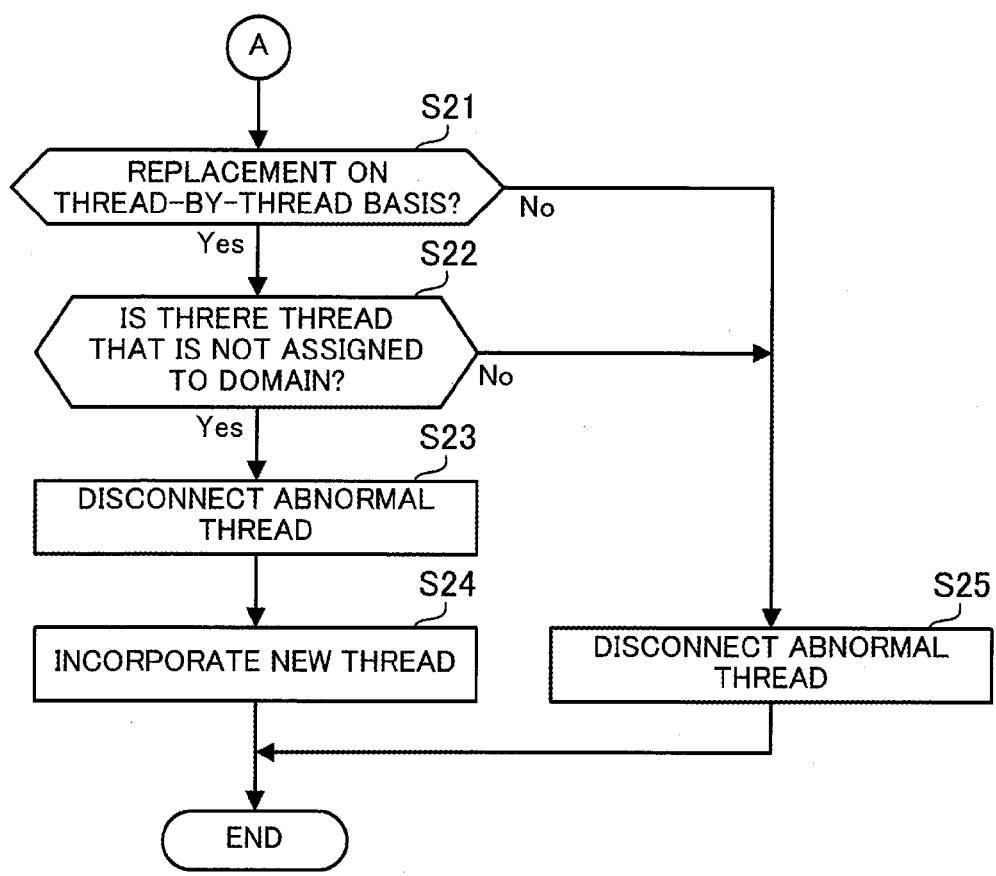

The following describes how the server apparatus 100 replaces an abnormal thread with another thread. FIGS. 9 and 10 are a flowchart illustrating an exemplary thread replacement process.

(Step S11) When detecting an abnormality in any of threads assigned to logical domains, the abnormality detection unit 131 notifies the domain management unit 140 of this abnormality detection. Thereby, step S12 and subsequent steps are executed.

(Step S12) In the server apparatus 100, information indicating whether replacement on a core-by-core basis is performed or not is previously stored. This information is entered to the server apparatus 100 from, for example, a management terminal in accordance with user operations. This information is stored, for example, in a non-volatile storage device storing the above-described domain management program.

When receiving the notification of the abnormality in the thread, the domain management unit 140 determines whether to perform replacement on a core-by-core basis, based on the above information. Step S13 is executed when the replacement on a core-by-core basis is to be performed. Otherwise, step S21 of FIG. 10 is executed.

(Step S13) The domain management unit 140 determines whether there is any unlicensed core, with reference to the core management table 151. Step S14 is executed if there is an unlicensed core. Otherwise, step S21 of FIG. 10 is executed.

(Step S14) The domain management unit 140 performs a process for disconnecting the thread from which the abnormality was detected at step S11. More specifically, the domain management unit 140 instructs the guest OS running on the logical domain assigned the abnormal thread to disconnect the thread, as will be described later. In addition, the domain management unit 140 updates the status corresponding to the abnormal thread from "in use" to "fail" and the domain ID field corresponding to the abnormal thread to "none" in the domain management table 152.

(Step S15) The domain management unit 140 selects a core whose two threads both are not assigned to any logical domain, with reference to the domain management table 152. The domain management unit 140 selects one of the threads of the selected core, and performs a process for incorporating the selected thread.

The domain management unit 140 updates the status corresponding to the selected thread from "free" to "in use", and registers the ID of the logical domain that has been assigned the abnormal thread, in the domain ID field corresponding to the selected thread in the domain management table 152. In addition, the domain management unit 140 instructs the guest OS running on the logical domain that has been assigned the abnormal thread, to incorporate the selected thread, as will be described later.

(Step S16) The domain management unit 140 determines with reference to the domain management table 152 whether the other thread of the core including the abnormal thread is assigned to a logical domain. Step S17 is executed if the other thread is assigned to a logical domain. Otherwise, step S19 is executed.

(Step S17) The domain management unit 140 performs a process for disconnecting the other thread. This process is basically the same as step S14. The domain management unit 140 instructs the guest OS running on the logical domain assigned the other thread to disconnect the thread. In addition, the domain management unit 140 updates the status corresponding to the other thread from "in use" to "free" and the domain ID field corresponding to the thread to "none" in the domain management table 152.

(Step S18) The domain management unit 140 performs a process for incorporating the other thread (hereinafter, referred to as "non-selected thread") that was not selected at step S15 from the threads of the core selected at step S15. This process is basically the same as step S15. The domain management unit 140 updates the status corresponding to the non-selected thread from "free" to "in use" and registers the ID of the logical domain that has been assigned the thread disconnected at step S17, in the domain ID field corresponding to the non-selected thread in the domain management table 152. In addition, the domain management unit 140 instructs the guest OS running on the logical domain assigned the thread disconnected at step S17, to incorporate the non-selected thread, as will be described later.

(Step S19) The domain management unit 140 adds "1" to the abnormal core count in the core management table 151, and subtracts "1" from the unlicensed core count. Then, the core replacement process is completed, and each logical domain continues the normal operations.

Through the above steps S14 to S19, a core including a thread from which an abnormality was detected is replaced with another core. In this case, the number of active cores does not change, and thus it is possible to replace the abnormal thread without causing an excess of licenses.

(Step S21) In the server apparatus 100, information indicating whether replacement on a thread-by-thread basis is performed or not is previously registered. This information is entered to the server apparatus 100, from, for example, a management terminal in accordance with user operations. This information is stored, for example, in a non-volatile storage device storing the above-described domain management program.

The domain management unit 140 determines whether to perform replacement on a thread-by-thread basis, based on the above information. Step S22 is executed when the replacement on a thread-by-thread basis is to be performed. Otherwise, step S25 is executed.

(Step S22) The domain management unit 140 determines with reference to the domain management table 152 whether there is a thread having a status of "free", that is, whether there is a thread which is not assigned to any logical domain and from which an abnormality is not detected. Step S23 is executed if there is a thread having a status of "free". Otherwise, step S25 is executed.

(Step S23) The domain management unit 140 performs a process for disconnecting a thread from which an abnormality was detected at step S11. This process is the same as step S14, and therefore will not be described again.

(Step S24) The domain management unit 140 selects a thread having a status of "free" with reference to the domain management table 152, and performs a process for incorporating the selected thread.

This process is basically the same as step 15. The domain management unit 140 updates the status corresponding to the selected thread from "free" to "in use", and registers the ID of the logical domain that has been assigned the abnormal thread, in the domain ID field corresponding to the selected thread in the domain management table 152. In addition, the domain management unit 140 instructs the guest OS running on the logical domain that has been assigned the abnormal thread to incorporate the selected thread.

Then, the thread replacement process is completed, and each logical domain continues the normal operations.

Through the above steps S23 and S24, a thread from which an abnormality was detected is replaced with one thread of a core having the other thread assigned to a logical domain. In this case, the number of active cores does not change, and thus it is possible to replace the abnormal thread without causing an excess of licenses.

(Step S25) The domain management unit 140 performs a process for disconnecting the thread from which an abnormality was detected at step S11. This process is the same as steps S14 and S23, and therefore will not be described again.

Figure 11:
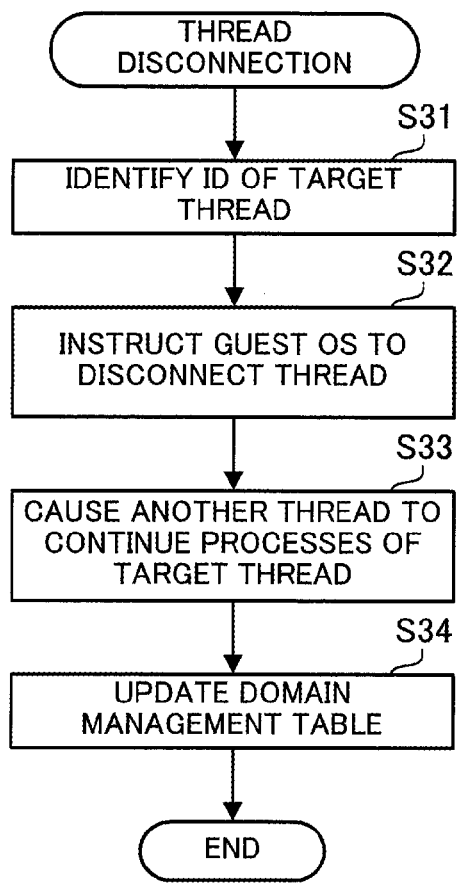
FIG. 11 is a flowchart illustrating an exemplary thread disconnection process.

FIG. 11 is a flowchart illustrating an exemplary thread disconnection process. This process of FIG. 11 corresponds to steps S14 and 17 of FIG. 9 and steps S23 and S25 of FIG. 10.

(Step S31) The domain management unit 140 identifies the ID of a target thread to be disconnected.

(Step S32) The domain management unit 140 notifies the guest OS running on the logical domain assigned the target thread of the ID of the target thread, to make an instruction for the disconnection of the target thread.

(Step S33) When receiving the disconnection instruction, the guest OS causes another thread assigned to the own guest OS to continue the process that has been performed using the target thread. The guest OS also sets the target thread to a state where the guest OS does not use the target thread. When the above process is completed, the guest OS instructs the hypervisor 130 to deactivate the target thread.

(Step S34) The domain management unit 140 receives the instruction for deactivating the target thread via the hypervisor 130. The domain management unit 140 updates the status corresponding to the target thread from "in use" to "fail", and the domain ID field corresponding to the target thread to "none" in the domain management table 152.

Figure 12:
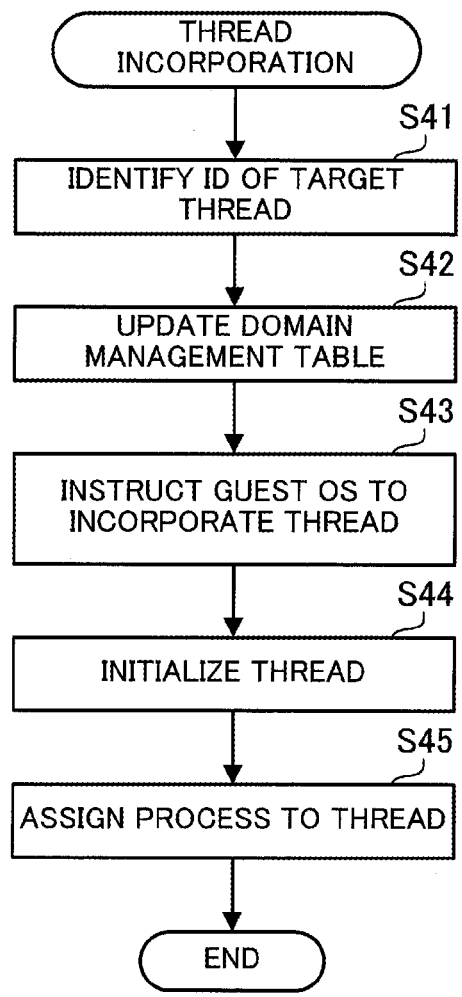
FIG. 12 is a flowchart illustrating an exemplary thread incorporation process.

FIG. 12 is a flowchart illustrating an exemplary thread incorporation process. This process of FIG. 12 corresponds to steps S15 and S18 of FIG. 9 and step S24 of FIG. 10.

(Step S41) The domain management unit 140 identifies the ID of a target thread to be incorporated.

(Step S42) The domain management unit 140 updates the status corresponding to the target thread from "free" to "in use" and registers the ID of the logical domain assigned a thread used before the replacement in the domain ID field corresponding to the target thread, in the domain management table 152.

(Step S43) The domain management unit 140 notifies the guest OS running on the logical domain newly assigned the target thread of the ID of the target thread, thereby making an instruction for the incorporation of the target thread.

(Step S44) When receiving the incorporation instruction, the guest OS instructs the hypervisor 130 to activate the target thread. The guest OS also performs an initialization process on the register, Translation Lookaside Buffer (TLB), etc. of the target thread.

(Step S45) The guest OS assigns a process to the target thread.

The following describes exemplary transitions of management tables in the case where the replacement on a core-by-core basis is performed. FIG. 13 illustrates an exemplary transition of a core management table. FIG. 14 illustrates an exemplary transition of a domain management table.

In the example of FIGS. 13 and 14, it is assumed that the server apparatus 100 is provided with eight cores each including two threads, and licenses are obtained for six cores. In the initial state, the abnormal core count is "0" and the unlicensed core count is "2" in the core management table 151, as illustrated in the upper part of FIG. 13.

In addition, as illustrated in FIG. 14, before an abnormality occurs in a thread, threads #0 to #4 are assigned to logical domains, and the other threads are not assigned to any logical domain. In this case, the cores #0 to #2 are active. Therefore, the domain-assigned core count is "3", and the domain-unassigned core count is "3".

Assume that, in this state, an abnormality is detected from the thread #2. In the case of the replacement on a core-by-core basis, the domain management unit 140 updates the status corresponding to the thread #2 from "in use" to "fail" in the domain management table 152. In addition, the domain management unit 140 updates the status corresponding to the thread #3 from "in use" to "free". Further, the domain management unit 140 updates the domain ID fields corresponding to the respective threads #2 and #3 from "1" to "none". Thereby, the threads #2 and #3 are disconnected from the logical domain #1, and activation of the core #1 including the threads #2 and #3 is prohibited.

In addition, the domain management unit 140 selects, for example, the core #3 as a core whose two threads both have a status of "free". In this case, the domain management unit 140 updates the statuses corresponding to the respective threads #6 and #7 included in the core #3 from "free" to "in use". Further, the domain management unit 140 registers the domain ID "1" identifying the logical domain that has been assigned the thread #2 in the domain ID field corresponding to the thread #6, and also registers the domain ID "1" identifying the logical domain that has been assigned the thread #3 in the domain ID field corresponding to the thread #7. Thereby, the threads #6 and #7 are incorporated in the logical domain #1.

At this time, the domain management unit 140 adds "1" to the abnormal core count and subtracts "1" from the unlicensed core count in the core management table 151. In this case, the licensed core count, that is, the sum of the domain-assigned core count and the domain-unassigned core count keeps the value of "6". That is to say, it is possible to replace an abnormal thread with a normal thread without causing an excess of licenses.

(Third Embodiment)

Figure 15:
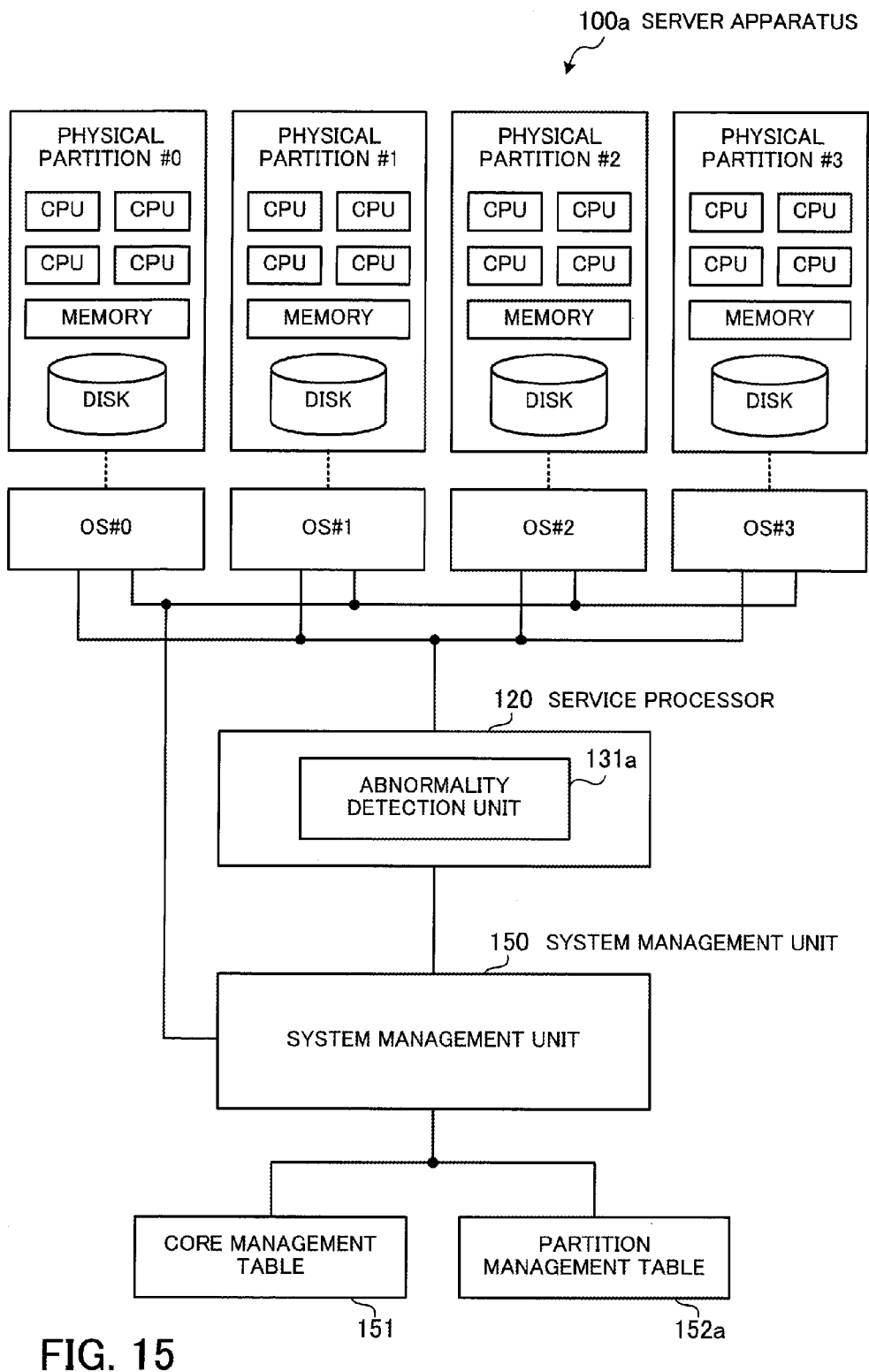
FIG. 15 is a block diagram illustrating the functions of an information processing apparatus according to a third embodiment.

FIG. 15 is a block diagram illustrating the functions of an information processing apparatus according to a third embodiment.

A server apparatus 100a illustrated in FIG. 15 is a modification of the server apparatus 100 of the second embodiment, and is designed to set up physical partitions, instead of creating virtual machines. Some of the hardware resources of the server apparatus 100a are assigned to physical partitions #0 to #3 of FIG. 15. A CPU assigned to each physical partition corresponds to a thread in a core. In addition, a plurality of CPUs, that is, a plurality of threads may be assigned to each physical partition.

On each physical partition, one or more assigned CPUs, that is, one or more assigned threads execute an OS program, which enables a different OS to run on each physical partition. Referring to the example of FIG. 15, OSes #0, #1, #2, and #3 run on the physical partitions #0, #1, #2, and #3, respectively.

The server apparatus 100a includes a system management unit 150. Processes performed by this system management unit 150 correspond to those performed by the domain management unit 140 of the second embodiment. In this connection, the processes performed by the system management unit 150 are realized by a processor of the server apparatus 100a executing a system management program. The system management program is executed by, for example, at least one CPU chip provided in any one building block.

In addition, the server apparatus 100a stores, in its local storage device, a core management table 151 and a partition management table 152a. The core management table 151 contains the same information as that of the second embodiment. The partition management table 152a has the same fields as the domain management table 152 of FIG. 8, except that the "domain ID" is replaced with the "partition ID". That is, the partition management table 152a is used to manage assignment of threads to partitions on which different OSes run.

Processes performed by the service processor 120 are realized by the CPU 121 (see FIG. 3) of the service processor 120 executing a predetermined firmware program. The service processor 120 includes an abnormality detection unit 131a. Similarly to the abnormality detection unit 131 of the second embodiment, the abnormality detection unit 131a is able to detect an abnormality occurring in hardware resources specifically provided for each thread in a core.

In the above server apparatus 100a, the processes among the hypervisor 130, domain management unit 140, and guest OS according to the second embodiment are performed by the service processor 120, system management unit 150, and OS. That is, in this third embodiment, the processes illustrated in FIGS. 9 to 12 are realized using the service processor 120, system management unit 150, and OS instead of using the hypervisor 130, domain management unit 140, and guest OS, respectively. As a result, the third embodiment also makes it possible to replace an abnormal thread with another normal thread without causing an excess of licenses when an abnormality occurs in the thread.

(Exemplary Process for Replacing Another Hardware Resource)

In the above second and third embodiments, a license is given for each core. Alternatively, a license may be given for another hardware resource provided in a server apparatus.

The following describes the case where a license is given for each memory device provided in a server apparatus. The server apparatus includes a plurality of memory devices which each need to be licensed. In addition, it is assumed that each of divided areas obtained by dividing the storage area of each memory device is assigned as a memory resource to, for example, each logical domain of the second embodiment or each physical partition of the third embodiment. It is further assumed that the abnormality detection unit 131 of the second embodiment or the abnormality detection unit 131a of the third embodiment is able to detect an abnormality in each of the above divided areas.

Figure 16:
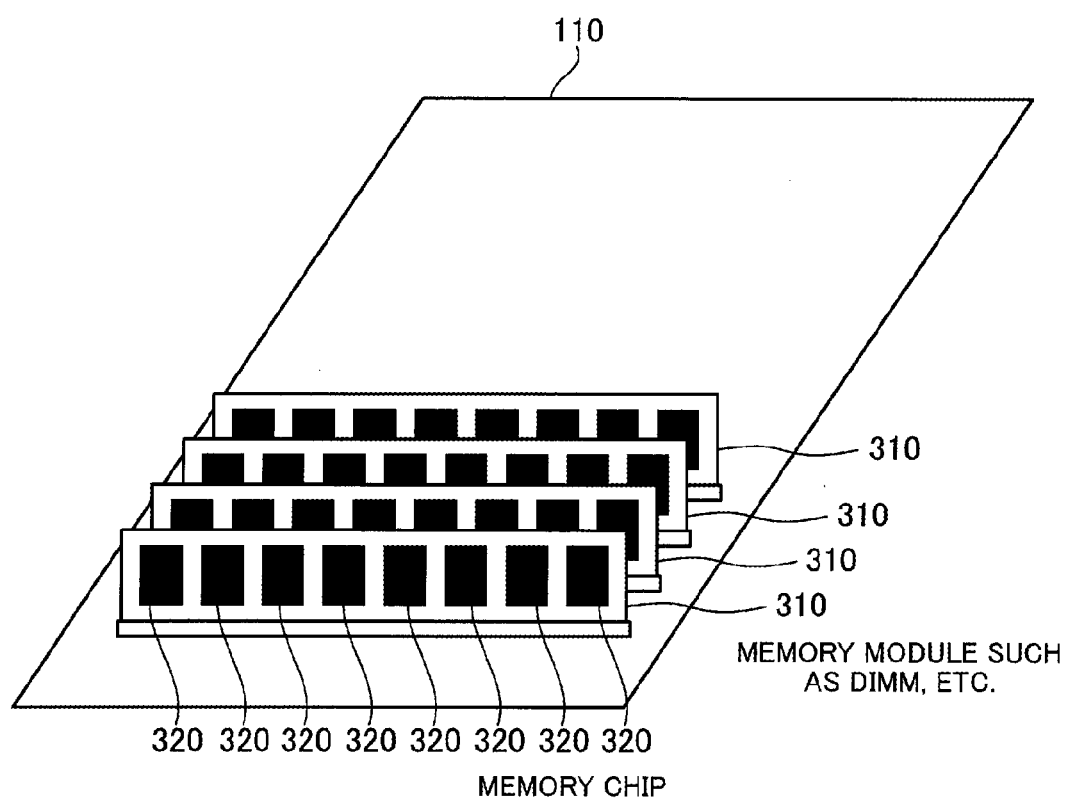
FIG. 16 illustrates a first example of license setting for memory devices.

FIG. 16 illustrates a first example of license setting for memory devices. A plurality of memory modules 310 is mounted on a building block 110 illustrated in FIG. 16. The memory module 310 is a Dual Inline Memory Module (DIMM) substrate, for example. In addition, a plurality of memory chips 320 is mounted on each memory module 310.

In this connection, building blocks correspond to the building blocks 110a to 110d illustrated in FIG. 2. In addition, one or a plurality of memory modules 310 corresponds to one of the memories 112a and 112b illustrated in FIG. 2.

In FIG. 16, for example, the memory module 310 corresponds to the above memory device, and each memory chip 320 in the memory module 310 corresponds to the above divided area. That is, the server apparatus assigns each memory chip 320 as a memory resource to a logical domain or physical partition. On the other hand, a license is given for each memory module 310.

The server apparatus monitors an abnormality in each memory chip 320. When detecting an abnormality in one of the memory chips 320 assigned to the logical domains or physical partitions, the server apparatus prohibits the use of the memory module 310 including the abnormal memory chip 320. In addition, the server apparatus replaces the use-prohibited memory module 310 with another available memory module 310 (that is, a memory module 310 whose memory chips 320 are all not assigned to logical domains or physical partitions), and starts to use the replacement memory module 310.

Such a process makes it possible to replace a memory chip 320 without causing an excess of licenses when an abnormality occurs in the memory chip 320.

In this connection, in the example of FIG. 16, a license is given for each memory module 310. Alternatively, a license may be given for a set of a plurality of adjacent memory chips 310 in the same memory module 310. In this case, a license may be given for each capacity that is the total storage capacity of the plurality of adjacent memory chips 310.

Figure 17:
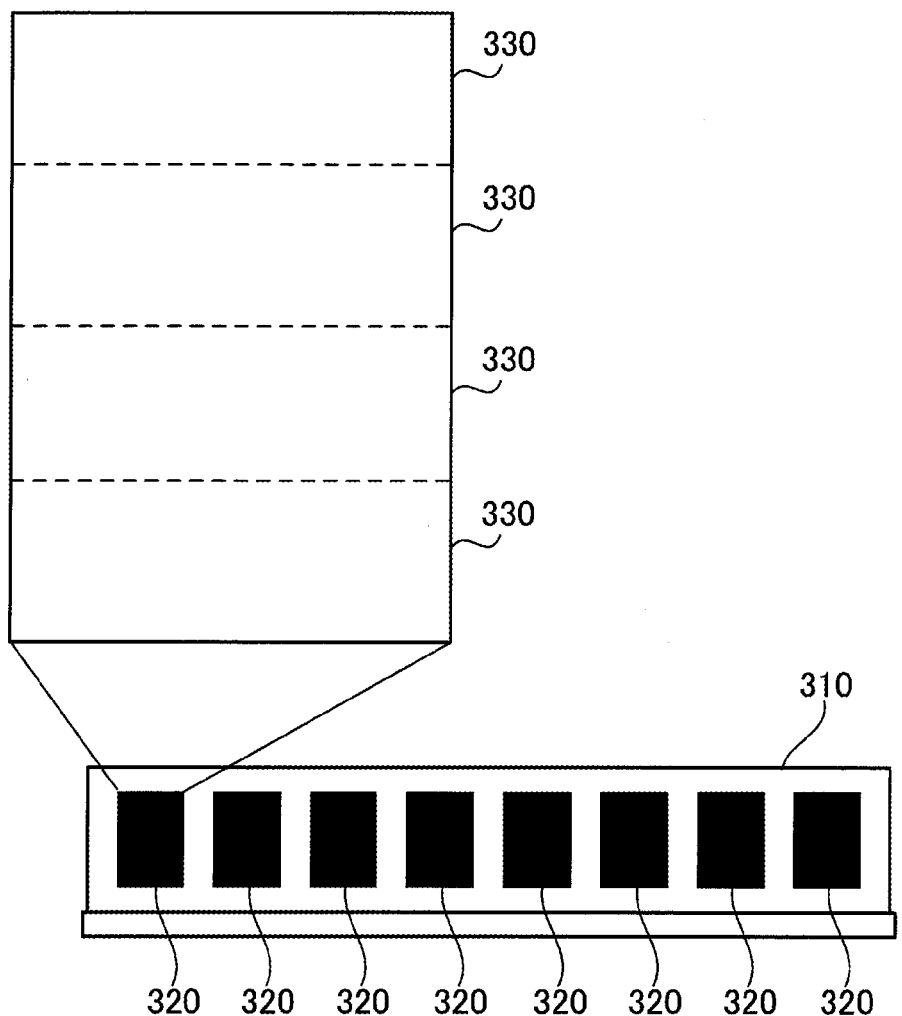
FIG. 17 illustrates a second example of license setting for memory devices.

FIG. 17 illustrates a second example of license setting for memory devices. In the example of FIG. 17, the above memory devices are used as memory chips 320 in the memory module 310, and the above divided areas are used as partial areas 330 obtained by dividing the memory area of a memory chip 320 by, for example, the same volume.

In the example of FIG. 17, the server apparatus assigns each partial area 330 as a memory resource to a physical domain or physical partition. On the other hand, a license is given for each memory chip 320.

When detecting an abnormality from any one of the partial areas 330 assigned to logical domains or physical partitions, the server apparatus prohibits the use of the memory chip 320 including the abnormal partial area 330. In addition, the server apparatus replaces the use-prohibited memory chip 320 with another available memory chip 320, and starts to use the replacement memory chip 320.

The above process makes it possible to replace a partial area 330 without causing an excess of licenses when an abnormality occurs in the partial area 330.

According to one aspect, an information processing apparatus and control method make it possible to prevent an excess of licenses when an abnormal hardware resource is replaced with another.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus that is capable of performing a plurality of processes in parallel and includes a plurality of operation components each including individual components provided for performing respective processes to be performed in parallel, the information processing apparatus comprising:
   a storage device configured to store a number of right-to-use licenses, one given for each of the operation components; and
   a processor configured to permit activation of as many operation components as the number of right-to-use licenses out of the plurality of operation components, and upon detecting an abnormality in one of the individual components included in one of active operation components out of the plurality of operation components, deactivate other individual components of the active operation component including the individual component from which the abnormality was detected, and activate one of inactive operation components out of the plurality of operation components, wherein:
   the processor executes monitoring of each of the individual components to detect any one of abnormalities of the individual components, and
   upon detecting the abnormality in the one of the individual components included in the one of the active operation components in accordance with the monitoring, deactivates the other individual components in addition to deactivation of the individual component from which the abnormality was detected, and activates the one of the inactive operation components in accordance with the number of right-to-use licenses instead of the active operation component including the individual component from which the abnormality was detected.

2. The information processing apparatus according to claim 1, wherein, upon detecting the abnormality in the individual component included in the active operation component, the processor determines whether or not there is an individual component that is not in use in the active operation components when there is no inactive operation component, and when determining that there is an individual component not in use, causes the individual component not in use to perform a process that has been performed using the individual component from which the abnormality was detected.

3. The information processing apparatus according to claim 1, wherein:
   the storage device stores management information that is information on individual components assigned processes of one or a plurality of operating systems out of the individual components included in the active operation components; and
   the processor, upon detecting an abnormality in an individual component assigned a process of an operating system by the management information, determines based on the management information whether there is an individual component that is not assigned any process of the operating systems in the individual components included in the active operation components when there is no inactive operation component, and when determining that there is an individual component that is not assigned any process of the operating systems, updates the management information so as to replace the individual component from which the abnormality was detected with the individual component that is not assigned any process of the operating systems.

4. The information processing apparatus according to claim 1, further comprising a plurality of memory apparatuses, wherein
the storage device stores a number of right-to-use memory licenses, one given for each of the memory apparatuses, and
the processor permits use of as many memory apparatuses as the number of right-to-use memory licenses out of the plurality of memory apparatuses, and upon detecting an abnormality in a divided area obtained by dividing a memory area of a memory apparatus in use, prohibits use of other divided areas of the memory apparatus including the divided area from which the abnormality was detected, and starts to use one of memory apparatuses not in use.

5. A control method of an information processing apparatus that is capable of performing a plurality of processes in parallel and includes a plurality of operation components each including individual components provided for performing respective processes to be performed in parallel, the control method comprising:
permitting, with reference to a storage device storing a number of right-to-use licenses, one given for each of the operation components, activation of as many operation components as the number of right-to-use licenses out of the plurality of operation components;
deactivating, upon detecting an abnormality in one of the individual components included in one of active operation components out of the plurality of operation components, other individual components of the active operation component including the individual component from which the abnormality was detected, and activating one of inactive operation components out of the plurality of operation components; and
executing monitoring of each of the individual components to detect any one of abnormalities of the individual components,
wherein the deactivating includes, upon detecting the abnormality in the one of the individual components included in the one of the active operation components in accordance with the monitoring, deactivating the other individual components in addition to deactivation of the individual component from which the abnormality was detected, and the activating includes activating the one of the inactive operation components in accordance with the number of right-to-use licenses instead of the active operation component including the individual component from which the abnormality was detected.

6. The control method according to claim 5, further comprising:
determining, upon detecting the abnormality in the individual component included in the active operation component, whether or not there is an individual component that is not in use in the active operation components when there is no inactive operation component, and when determining that there is an individual component not in use, causing the individual component not in use to perform a process that has been performed using the individual component from which the abnormality was detected.

7. The control method according to claim 5, wherein:
the storage device stores management information that is information on individual components assigned processes of one or a plurality of operating systems out of the individual components included in the active operation components; and
the control method further includes, upon detecting an abnormality in an individual component assigned a process of an operating system by the management information, determining based on the management information whether there is an individual component that is not assigned any process of the operating systems in the individual components included in the active operation components when there is no inactive operation component, and when determining that there is an individual component that is not assigned any process of the operating systems, updating the management information so as to replace the individual component from which the abnormality was detected with the individual component that is not assigned any process of the operating systems.

8. The control method according to claim 5, wherein:
the information processing apparatus includes a plurality of memory apparatuses;
the storage device stores a number of right-to-use memory licenses, one given for each of the memory apparatuses; and
the control method further includes permitting use of as many memory apparatuses as the number of right-to-use memory licenses out of the plurality of memory apparatuses, and upon detecting an abnormality in a divided area obtained by dividing a memory area of a memory apparatus in use, prohibiting use of other divided areas of the memory apparatus including the divided area from which the abnormality was detected, and starting to use one of memory apparatuses not in use.

\* \* \* \* \*